United States Patent [19]
Koenig et al.

[11] Patent Number: 5,781,123
[45] Date of Patent: Jul. 14, 1998

[54] OPERATOR CONTROL LOGGING DEVICE FOR AN ELECTRICAL DEVICE

[75] Inventors: Winfried Koenig, Pfinztal; Christa Heiland-Franzen, Eggenstein-Leopoldshafen, both of Germany

[73] Assignee: Robert Bosch GmbH, Stuttgart, Germany

[21] Appl. No.: 543,680

[22] Filed: Oct. 16, 1995

[30] Foreign Application Priority Data

Oct. 14, 1994 [DE] Germany .................. 44 36 734.1

[51] Int. Cl.[6] ........................................ H04B 1/00
[52] U.S. Cl. ................ 340/825.62; 340/825.57; 340/825.65; 340/825.22; 340/825.24; 340/825.25; 455/151.1; 455/345; 455/152.1
[58] Field of Search ............... 340/825.62, 825.57, 340/825.65, 825.22, 825.24, 825.25; 455/151.1, 152.1, 345

[56] References Cited

U.S. PATENT DOCUMENTS 4,531,232  7/1985  Sakurai ........................... 455/152

5,271,063  12/1993  D'Alayer De Costomore D'Arc . 381/104

*Primary Examiner*—Michael Horabik
*Assistant Examiner*—Yonel Beaulien
*Attorney, Agent, or Firm*—Kenyon & Kenyon

[57] ABSTRACT

In a logging device for registering the frequency of manually entered operator control functions for an electrical device, the frequency of entered operator control functions are selectively counted. Consequently, it can be established with which frequency the individual operator control functions are activated. The logging device may be connected separately to the electrical device, for example a car radio, via a bus or be integrated into the electrical device. The operating characteristics of a certain operator can be stored individually for the operator and can be output automatically when this operator enters an identification code. This simplifies the operating of an electrical device with high operating convenience. It is also advantageous that, for example in the motor vehicle, the driver is distracted less from the traffic situation when operating the car radio.

15 Claims, 5 Drawing Sheets

OPERATOR CONTROL LOGGING DEVICE FOR AN ELECTRICAL DEVICE

FIELD OF THE INVENTION

The present invention relates to a logging device for registering the frequency of manually entered operator control functions for an electrical device.

BACKGROUND INFORMATION

The considerable miniaturization of components and the desire for greater convenience in the operating of electrical or electronic devices gives rise to the problem that the many possible functions for operating the device can no longer be called up by individual buttons, since there is often not the space for the many buttons. Therefore, to simplify matters, control programs have been developed, by which it is intended to facilitate the operating of the device by menu prompting (interactive menu control). However, in menu control, there arises the disadvantage that the individual operator control functions have to be called in a definite predetermined sequence. This is not always desired, however, since the individual users of the device act in different ways. Therefore, an optimum design of the menu control is not possible in the case of known devices.

SUMMARY OF THE INVENTION

The logging device according to the present invention for registering the frequency of manually entered operator control functions for an electrical device has the advantage that, by weighting the entered functions, the selection of the functions can be controlled via the menu in such a way that important and frequently used functions can be operated first and, thereafter, the less frequent or rarely used functions. As an advantageous result, optimum adaptation to the technical systems used by people is achieved, and operator control is significantly simplified, since all the functions do not always have to be selected.

Since the logging device separately adds up the frequency of operator control actions, it can carry out a weighting, the functions with the greatest frequency receiving the greatest weighting factor. The individual functions may advantageously be output according to their weighting factor on a display, so that for example the device developer can already take this frequency distribution into consideration for a subsequent device generation.

On the other hand, the logging device may advantageously be built into the electrical device and consequently automatically weight the operator control actions entered within a predetermined time period and display them accordingly. As a result, the man/machine adaptation can be individually optimized within an extremely short time.

The logging device preferably has a memory in which the individual operator control actions are stored by means of a control program. Since the memory is not very large and the control program is relatively simple, the logging device can be integrated into the electrical device and can be advantageously substituted by the control computer of the latter. As a result, the expenditure for the logging device is reduced.

A preferred application may be the operating of a car radio or a driver information system, since these devices already have a large number of integrated functions, which can no longer be operated satisfactorily by means of individual operating buttons.

DETAILED DESCRIPTION

Figure 1:
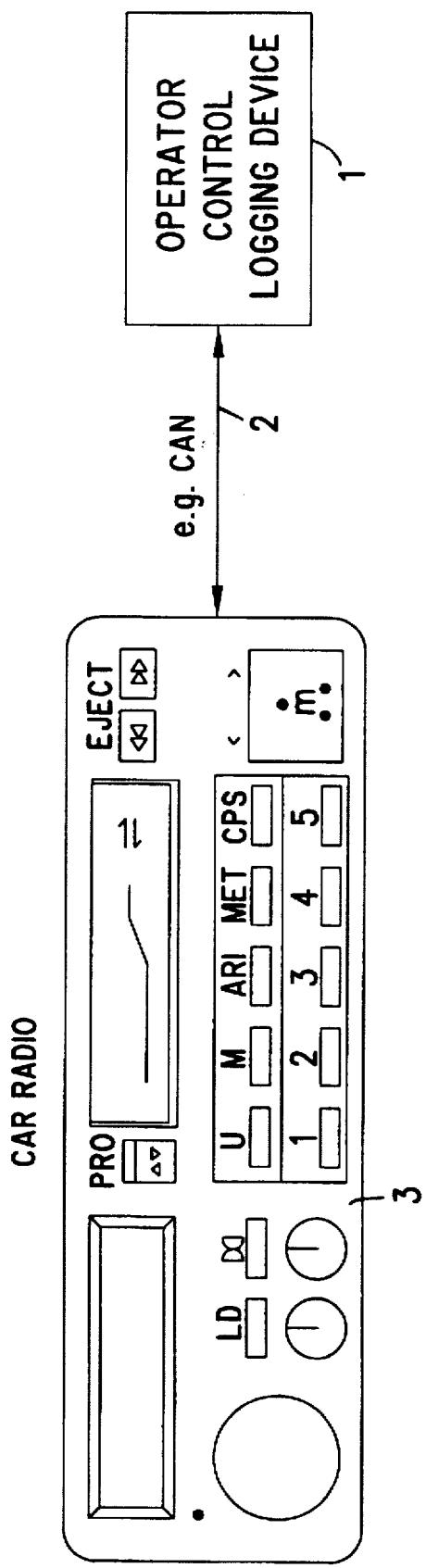
FIG. 1 shows a block diagram of an exemplary embodiment of an arrangement including a car radio and a logging device according to the present invention.

FIG. 1 shows a block diagram in which a logging device 1 is connected via a data bus 2, for example the CAN bus, to a car radio 3. Via the data bus 2, the logging device 1 receives each operator control function of the car radio 3, i.e. each press of a button is selectively stored in the logging device 1. The stored data may be read out, for example, likewise via the data bus 2 or be output on the display of the car radio 3. Through the external coupling of the logging device 1, the operating activities of the user can consequently be logged during the normal operation of the car radio 3. After the elapse of the accumulating phase, the frequency of the individual activated operator control functions is evaluated in the sense that, for example, in interactive operator prompting, the operator control functions which had the highest frequency are retrieved first. The logging device 1 is then no longer required. Of course, other electrical devices, such as driver information systems, navigation systems, transceivers, etc. can also be connected to the logging device 1.

Figure 2:
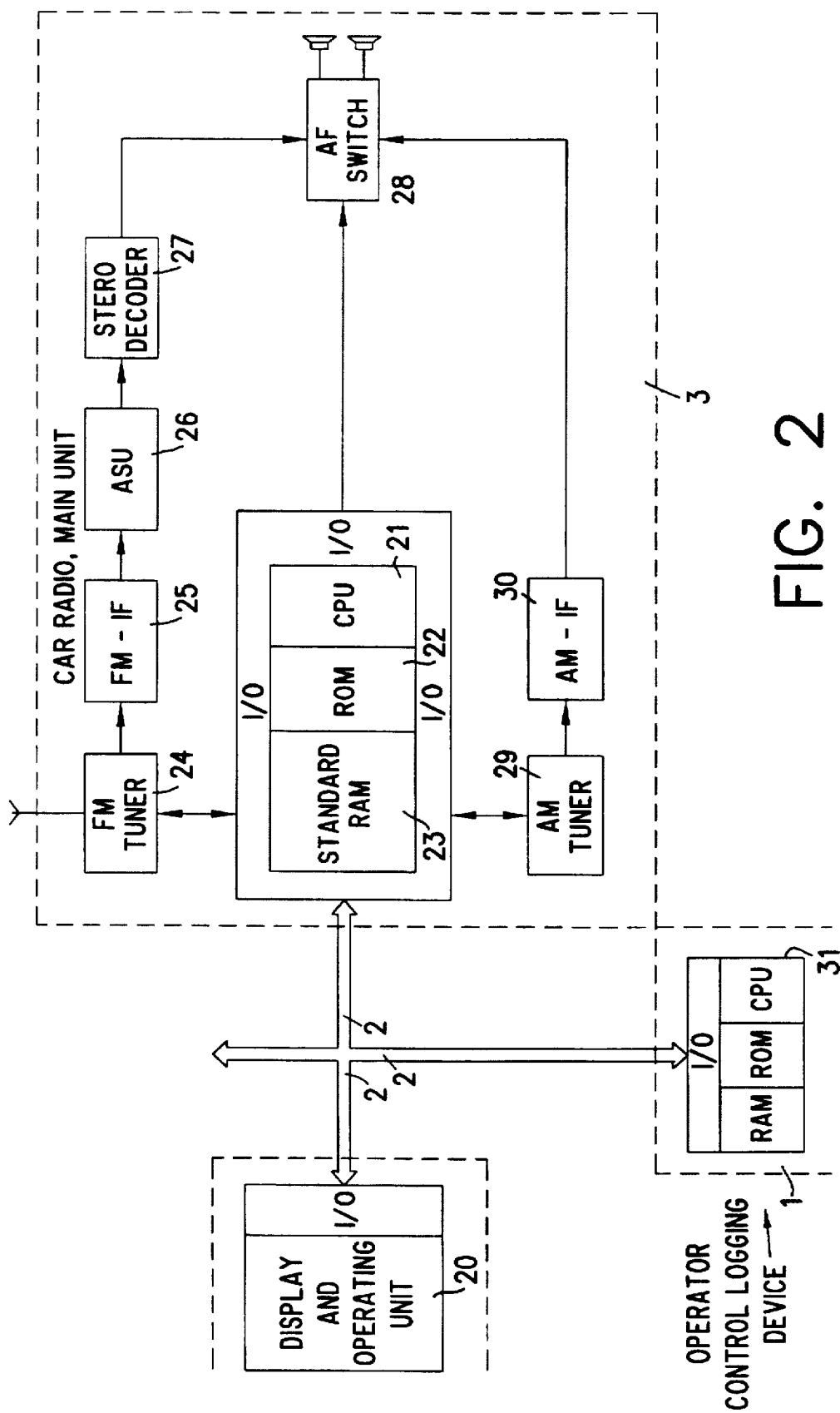
FIG. 2 shows an exemplary embodiment with a separate logging device according to the present invention.

FIG. 2 shows a more detailed block diagram of the arrangement represented in FIG. 1. The logging device 1 is again connected to the car radio 3. The car radio 3 has the customary modules, such as a control computer CPU 21, a ROM memory 22 and a standard RAM 23. The control computer 21 is connected via corresponding inputs/outputs IO to corresponding modules, such as an FM tuner 24 with corresponding filters FM-IF 25, a switching unit ASU 26, a stereo decoder 27 and an output stage 28. Also provided is an AM tuner 29 with a filter AM-IF 30, which is likewise led to the output stage 28 with corresponding loudspeakers.

The logging device 1 is connected via the bus 2. The logging device essentially has a control computer 31, with corresponding RAM and ROM memories. Also connected via the bus are a display and an operating unit 20 of the car radio. When the unit 20 is operated, the operator control commands are consequently passed via the bus 2 also to the logging device 1 and are stored by the latter selectively in the RAM memory. The CPU 31 is controlled by a corresponding control program for carrying out this function in such a way that, when there is an incoming command, first of all the command itself is decoded, for example the command "station search". For each possible operator control command, a memory group is formed in the RAM memory, so that, after the decoding of an operator control command, a counter increments the corresponding memory by a value. The last count value is then stored in the corresponding memory part, for example under the command "station search". For reading out and displaying, the respective count values stored last are then retrieved selectively for each command.

Figure 3:
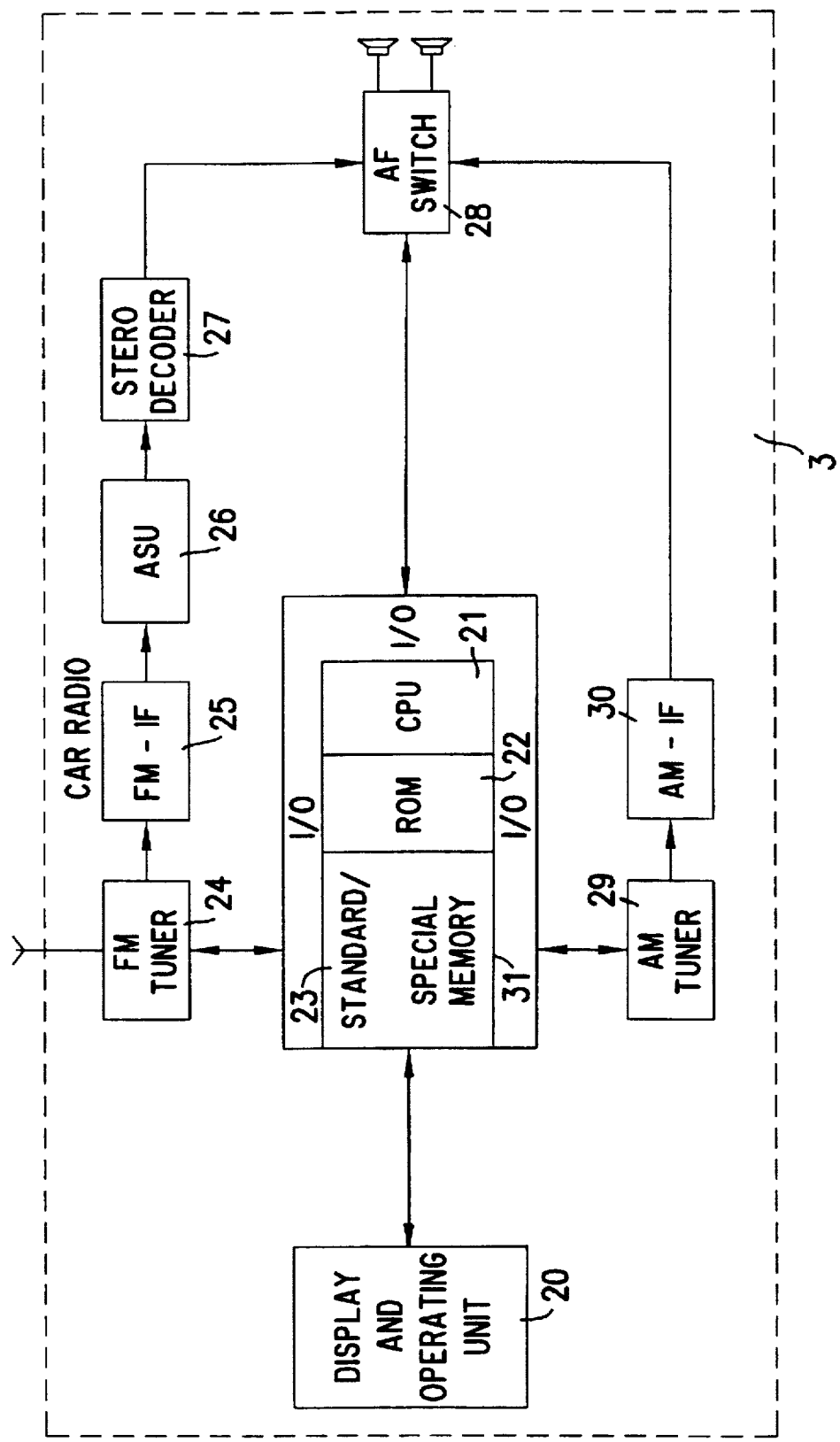
FIG. 3 shows a block diagram with a logging device integrated in a car radio, according to the present invention.

FIG. 3 shows a second exemplary embodiment, in which the logging device 1 or its functions are integrated in the electrical device 3. In this case, the RAM memory 23 of the car radio is expanded by a "special" area 31. This expanded area 31 consequently contains a separate memory area for each operator control function. The functional sequence is the same as described above in accordance with FIG. 2.

With the integrated solution, there is the advantage that in this case the logging device 1 is constantly connected to the electrical device 3 and, consequently, the different entry functions can be continuously added up for a certain time period. This makes it possible also to register selectively individual operating characteristics of an individual person. For example, one operator may be interested only in traffic information stations, whereas another may like to receive only stereo stations. After entering a code number, the logging device then knows which person is operating the car radio 3. It can then automatically output the menu-prompted control program preferred by this operator, with the corresponding priorities. The operator consequently has greater operating convenience, but has only to carry out simplified operating actions. In particular, when used in a motor vehicle, road safety can consequently be assisted, since the driver, as the operator, is distracted less from the traffic situation.

Figure 4:
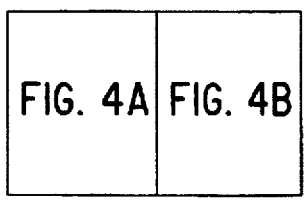
FIG. 4A shows a block diagram of a first portion of an interactive operator control menu according to the present invention.
FIG. 4B shows a block diagram of a second portion of the interactive operator control menu shown in FIG. 4A.
Figure 4A:
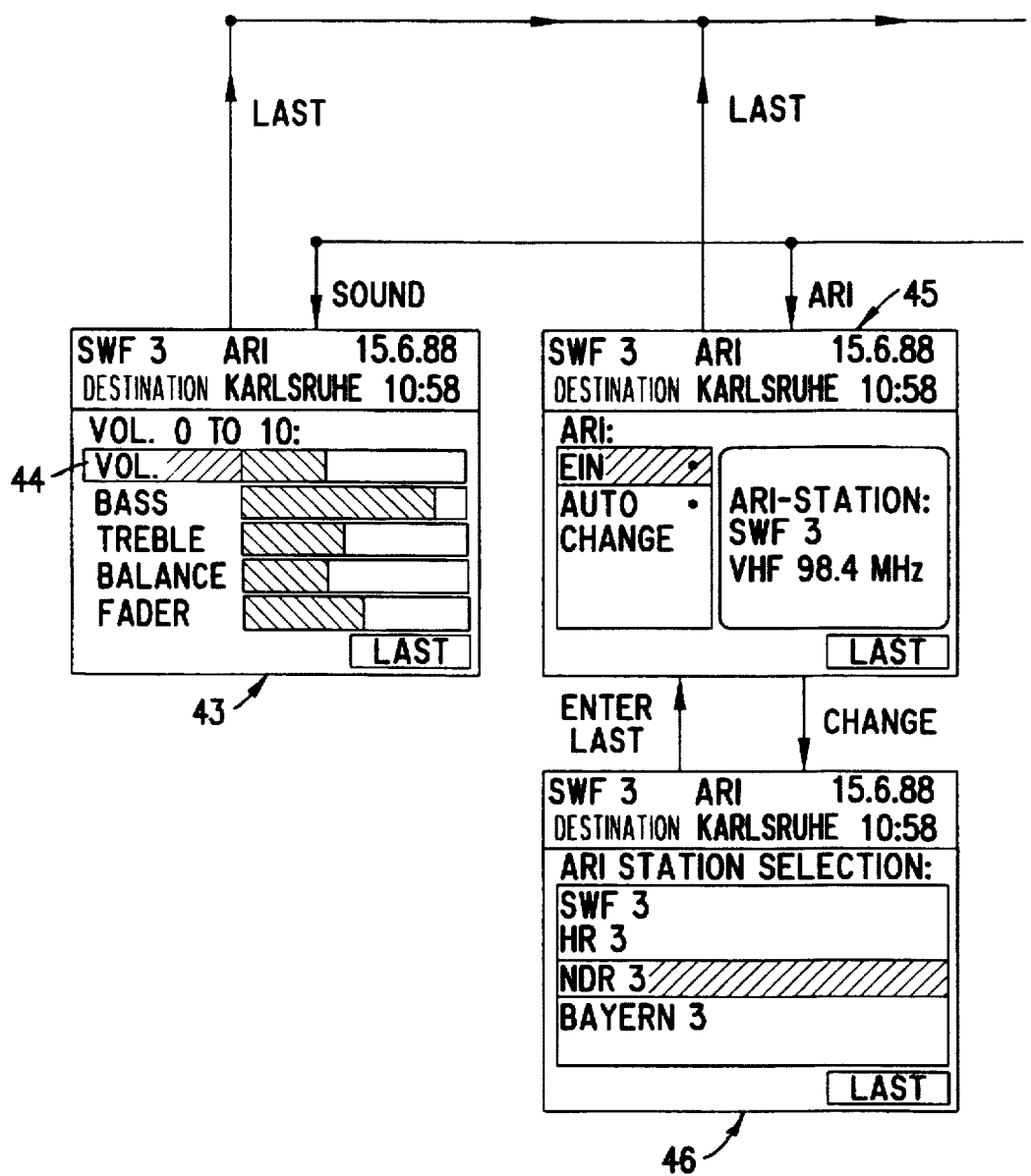
Figure 4B:
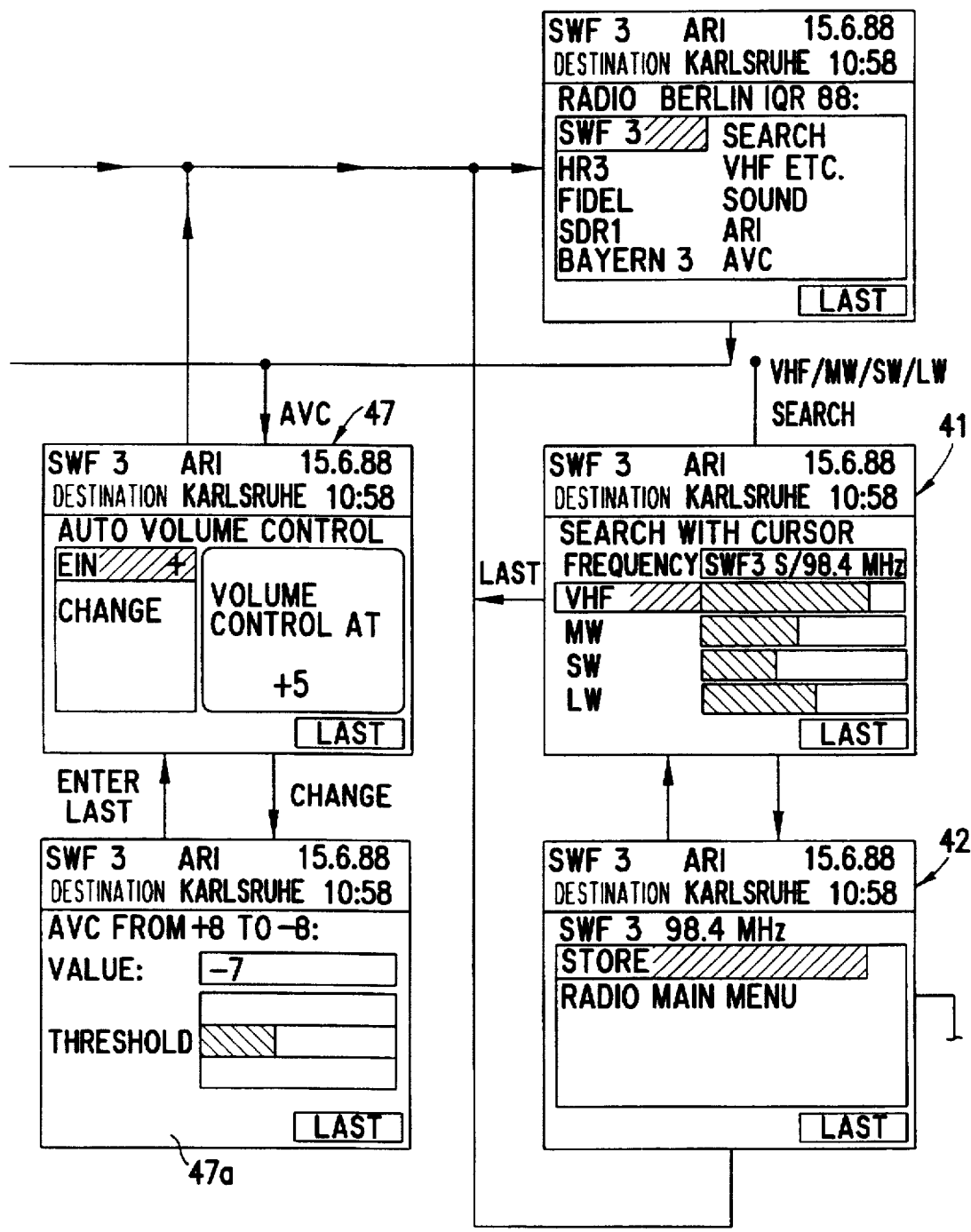

FIGS. 4A and 4B show a block diagram of an interactive operator control menu of a car radio 3, which has been optimized on the basis of the method according to the present invention. After switching on the radio, the search is activated in item 41. On the basis of the habits of the operator, first of all the VHF range is switched on, since this has the highest frequency of operation (long black bar). Once a desired station, for example SWF3, has been found, this is indicated in item 42. In the next step, in item 43, the volume control is then set. For this purpose, according to item 44, the predetermined value is adopted, unless it is to be changed (black bar). This value is likewise transferred to the main menu 42, unless it is to be changed. In the next step, in item 45, the ARI (broadcast information service for drivers) function is checked. In item 46, a different station with the ARI function may be selected, for example the station NDR3. This function is likewise transferred to the main menu 42. In item 47, a predetermined sound pattern, with a particular volume, bass, treble, balance setting and fader function, is called up. These presettings may be different for each operator, in accordance with item 47a. They are likewise transferred to the main menu 42 and therefore do not have to be reset.

If a different operator uses the car radio, changed setting values can then be available for this operator and are then selected in the way described above.

What is claimed is:

1. A device for registering a frequency by which a user of an electrical device manually enters each of a plurality of operator control functions of the electrical device, comprising:

a control device, the control device separately counting, up to a maximum value, a number of times that each of the operator control functions is entered by the user within a predetermined time period, providing a weighting factor for each of the operator control functions as a function of the count for each of the operator control functions and outputting the frequency by which the user of the electrical device enters each of the operator control functions as a function of the weighting factors; and a display device coupled to the control device for displaying each of the operator control functions.

2. The device according to claim 1, wherein the device is interactively controllable.

3. The device according to claim 1, wherein the electrical device includes at least one of a menu-controlled radio of a motor vehicle and a direct information system of the motor vehicle.

4. The device according to claim 1, wherein the greatest weighting factor is provided to the operator control function having the greatest count.

5. The device according to claim 4, wherein the operator control function having the greatest count is displayed first.

6. The device according to claim 1, wherein the counts determine an order in which the operator control functions are displayed.

7. The device according to claim 1, wherein the control device controls an operator control menu of the electrical device.

8. The device according to claim 7, wherein the menu allows the user to choose the operator control function having the greatest weighting factor first.

9. The device according to claim 7, wherein the menu allows the user to choose the operator control functions in a sequence of their weighting factors.

10. The device according to claim 1, wherein the device is connected external to the electrical device via a data bus.

11. The device according to claim 1, wherein the device is integrated into the electrical device.

12. The device according to claim 11, wherein the control device includes a control computer that executes a program stored in a memory device coupled to the control computer.

13. The device according to claim 1, wherein the control device recognizes each of the plurality of users and maintains separate counts and weighting factors for each user.

14. A method for registering a frequency by which a user of an electrical device manually enters each of a plurality of operator control functions of the electrical device, comprising the steps of:

separately counting, up to a maximum value, a number of times that each of the operator control functions is entered by the user within a predetermined time period;

providing a weighting factor for each of the operator control functions as a function of the count for each of the operator control functions, and outputting the frequency by which the user of the electrical device enters each of the operator control functions as a function of the weighting function.

15. A device for registering a frequency by which a user of an electrical device manually enters each of a plurality of operator control functions of the electrical device, comprising:

a memory storing a control program; and a control computer coupled to the memory, the control computer executing the control program to separately count, up to a maximum value, a number of times that each of the operator control functions is entered by the user within a predetermined time period, to provide a weighting factor for each of the operator control functions as a function of the count for each of the operator control functions and to output the frequency by which the user of the electrical device enters each of the operator control functions.

* * * * *